(12) United States Patent
Alvarez et al.

(10) Patent No.: US 8,983,918 B2
(45) Date of Patent: *Mar. 17, 2015

(54) INTERNATIONAL CROSS BORDER DATA MOVEMENT

(75) Inventors: Tammy Alvarez, Waxhaw, NC (US); Scott Margolis, Coppell, TX (US)

(73) Assignee: Bank of America Corporation, Charlotte, NC (US)

( * ) Notice: Subject to any disclaimer, the term of this patent is extended or adjusted under 35 U.S.C. 154(b) by 282 days.

This patent is subject to a terminal disclaimer.

(21) Appl. No.: 12/831,069

(22) Filed: Jul. 6, 2010

(65) Prior Publication Data

US 2011/0270872 A1 Nov. 3, 2011

Related U.S. Application Data

(60) Provisional application No. 61/329,724, filed on Apr. 30, 2010.

(51) Int. Cl.
*G06F 17/00* (2006.01)
*G06F 17/30* (2006.01)
(Continued)

(52) U.S. Cl.
CPC ............... *G06Q 10/06* (2013.01); *G06F 17/00* (2013.01); *G06Q 10/06313* (2013.01); *G06Q 10/103* (2013.01)
USPC ........... 707/694; 707/758; 707/769; 707/791; 707/802; 705/7.23; 705/7.27; 705/7.28; 706/47; 706/50

(58) Field of Classification Search
CPC .......... G06F 17/00; G06F 17/30; G06Q 10/00
USPC ................. 707/600–603, 607, 791, 802–807, 707/608–609, 694, 758, 769; 715/229, 231; 705/26.8, 28–29, 37–39, 300–301, 705/7.23, 7.27–7.28; 706/45–50
See application file for complete search history.

(56) References Cited

U.S. PATENT DOCUMENTS 5,944,790 A 8/1999 Levy
6,185,544 B1 * 2/2001 Sakamoto et al. .............. 705/40
(Continued)

FOREIGN PATENT DOCUMENTS

| WO | WO 02/19272 | * | 3/2002 |
| WO | WO 2004/003811 | * | 1/2004 |
| WO | WO 2005/119551 | * | 12/2005 |

OTHER PUBLICATIONS

Yiting Li, "Banks, private money, and government regulation",Journal of Monetary Economics 53 (2006) 2067-2083.*
(Continued)

*Primary Examiner* — Srirama Channavajjala
(74) *Attorney, Agent, or Firm* — Michael A. Springs

(57) ABSTRACT

In some embodiments, a data movement system comprises a memory and a processor. The memory is operable to store a request to move data from a first jurisdiction and at least one action item associated with the request to move data, the request to move data comprising (a) a data type, (b) a jurisdiction from which the data is to be moved, and (c) a purpose for moving the data. The processor is configured to receive an update to the request to move data, the update to the request changing at least one of the data type, the jurisdiction from which the data is to be moved, or the purpose for moving the data. The processor is configured to identify a set of data movement rules based at least in part upon the updated request to move data. The processor is configured to apply at least one rule of the set of data movement rules to identify an update to the at least one action item to be completed in order to comply at least in part with the regulations.

12 Claims, 14 Drawing Sheets

(51) Int. Cl.
    *G06Q 10/00* (2012.01)
    *G06Q 10/06* (2012.01)
    *G06Q 10/10* (2012.01)

(56) References Cited

U.S. PATENT DOCUMENTS

| | | | |
|---|---|---|---|
| 6,349,290 B1* | 2/2002 | Horowitz et al. | 705/35 |
| 6,529,911 B1* | 3/2003 | Mielenhausen | 1/1 |
| 6,772,131 B1* | 8/2004 | Francis et al. | 705/35 |
| 6,904,417 B2 | 6/2005 | Clayton et al. | |
| 7,207,067 B2 | 4/2007 | Feng et al. | |
| 7,383,233 B1* | 6/2008 | Singh et al. | 705/80 |
| 7,937,579 B2 | 5/2011 | Peckover | 713/151 |
| 2002/0010784 A1 | 1/2002 | Clayton et al. | 709/229 |
| 2002/0099649 A1* | 7/2002 | Lee et al. | 705/38 |
| 2002/0138407 A1* | 9/2002 | Lawrence et al. | 705/38 |
| 2003/0014654 A1* | 1/2003 | Adler et al. | 713/200 |
| 2003/0033228 A1* | 2/2003 | Bosworth-Davies et al. | 705/35 |
| 2003/0041033 A1* | 2/2003 | Kaplan | 705/64 |
| 2003/0088520 A1 | 5/2003 | Bohrer et al. | 705/74 |
| 2003/0105686 A1 | 6/2003 | Dang et al. | |
| 2003/0216986 A1* | 11/2003 | Hassan | 705/35 |
| 2004/0003353 A1* | 1/2004 | Rivera et al. | 715/530 |
| 2004/0054918 A1 | 3/2004 | Duri et al. | 713/200 |
| 2004/0093518 A1* | 5/2004 | Feng et al. | 713/201 |
| 2004/0098285 A1 | 5/2004 | Breslin et al. | |
| 2004/0193634 A1* | 9/2004 | Goodlett et al. | 707/102 |
| 2005/0027585 A1* | 2/2005 | Wodtke et al. | 705/9 |
| 2005/0027651 A1* | 2/2005 | DeVault | 705/38 |
| 2005/0076233 A1 | 4/2005 | Aarts et al. | |
| 2005/0144114 A1* | 6/2005 | Ruggieri et al. | 705/37 |
| 2005/0251433 A1* | 11/2005 | Orifici et al. | 705/7 |
| 2006/0047555 A1* | 3/2006 | Kang et al. | 705/9 |
| 2007/0022014 A1 | 1/2007 | Lee | |
| 2007/0100744 A1 | 5/2007 | Wu | |
| 2007/0283171 A1 | 12/2007 | Breslin et al. | |
| 2008/0015913 A1 | 1/2008 | Courtney et al. | |
| 2008/0147554 A1 | 6/2008 | Stevens et al. | |
| 2008/0183523 A1* | 7/2008 | Dikeman | 705/7 |
| 2008/0270802 A1 | 10/2008 | Ashley et al. | |
| 2009/0177554 A1 | 7/2009 | Powell | |
| 2010/0106645 A1 | 4/2010 | Peckover | |
| 2010/0153151 A1* | 6/2010 | Toenjes | 705/7 |

OTHER PUBLICATIONS

Yang Qifeng1 et al. "Study on Anti-Money Laundering Service System of Online Payment based on Union-Bank mode", IEEE, 2007 pp. 4991-4994.*

Notification of Transmittal of the International Search Report and The Written Opinion of the ISA, or the Declaration for PCT/US2011/30429; ISA/USA; 6 pages, May 19, 2011.

Notification of Transmittal of the International Search Report and The Written Opinion of the ISA, or the Declaration for PCT/US2011/30431; ISA/USA; 8 pages, May 26, 2011.

Notification of Transmittal of the International Search Report and The Written Opinion of the ISA, or the Declaration for PCT/US2011/30435; ISA/USA; 8 pages, May 26, 2011.

Patent Pending Application U.S. Appl. No. 12/831,104 entitled *International Cross Border Data Movement* in the name of Tammy Alvarez, et al.; 56 total pages, Filed Jul. 6, 2010.

Patent Pending Application U.S. Appl. No. 12/831,035 entitled *International Cross Border Data Movement* in the name of Tammy Alvarez, et al.; 51 total pages, Filed Jul. 6, 2010.

USPTO; Office Action for U.S. Appl. No. 12/831,035 in the name of Tammy Alvarez, et al.; 11 pages, Mar. 22, 2012.

Office Action Summary issued by the USPTO for U.S. Appl. No. 12/831,104; Inventor: Tammy Alvarez et al, Jul. 24, 2012.

Office Action Summary issued by the USPTO for U.S. Appl. No. 12/831,104; Inventor: Tammy Alvarez et al, Nov. 27, 2012.

U.S. Patent and Trademark Office Official Action in U.S. Appl. No. 12/831,035 dated Oct. 8, 2014, 16 pages, Oct. 8, 2014.

* cited by examiner

| | Standard Questions | Project Responses |
|---|---|---|
| | | Complete |
| Q1 | Confirm information on the registration form | |
| Q2 | Can you tell me more information about the project? (Review project charter, what capabilities will it enable etc) | |
| Q3 | Lets discuss business drivers. Why are we doing this? What capabilities will this enable for the business? Are we doing this already? If we are - are we enabling new countries, new functionality or both? | |
| Q4 | Can you walk me through the timeline of the project? Is this part of a multi-generational plan? When did the business case get approved? Have you had to push your dates forward or back for any reason? | |
| Q5 | What data elements are involved in this project? (Please be sure to discuss any and all that may apply) | ☐ Personal Data ☐ Customer/client specific identifiable data<br>☐ Background Data ☐ Individual transaction level data<br>☐ Transaction Data ☐ Any sovereign data of any type<br>☐ Government ☐ Information containing personal medical records<br>☐ Medical ☐ Religious or political affiliations<br>☐ Sensitive ☐ Trending to identify AML transactions<br>☐ AML<br>☐ AML<br>☐ Sales<br>☐ Servicing<br>☐ Marketing<br>☐ Financial Reporting<br>☐ Fulfillment<br>☐ Data Storage<br>☐ Testing<br>☐ Associate Access<br>☐ Reporting<br>☐ Processing<br>☐ Document Storage |
| Q6 | What is the purpose of using the above mentioned data elements? | |

TO FIG. 5B

FROM FIG. 5A

— 110a

| Q7 | Who will be using this data? |
| Q8 | How frequently will they be using this data? |
| Q9 | How long will they be using this data? |
| Q10 | Will the source and target countries be able to do what they want with the data independent of one another? |
| Q11 | Does one group have to instruct other groups on what needs to be done with the data? |
| Q12 | Have you been engaged with internal legal partners on this project? |
| Q13 | Have you been engaged with external counsel on this project? |
| Q14 | Have you been engaged with compliance or risk partners on this project? |
| Q15 | Is there project funding? |
| Q16 | Do you have funding for the use of external counsel on the project? |

ASSESSMENT SCOPING DETAIL

Business Purpose?
Privacy Regulatory Review?                    Controller to Controller
Bank Secrecy Regulatory Review?               Controller to Processor
Outsourcing Regulatory Review?                Banking Regulations
All Country Requests the Same?                Securities Regulations
If no – detail out the variability by
country at a high level

*FIG. 5B*

| | INITIAL REQUEST ASSESSMENT | | | |
|---|---|---|---|---|
| | Customer or Client Data | | Associate Data Request Referred to | |
| | Data Moving within Multiple Jurisdictions | | | |
| | Associate Data | | Date Project Notified | Date Interview Scheduled |

| | | |
|---|---|---|
| (1) | Project Name | |
| (2) | Overview | |
| (3) | Requestor Name | |
| (4) | Requestor Phone | |
| (5) | Requestor Email | |
| (6) | Request Date | |
| (7) | Type | |
| (8) | Funded | |
| (9) | Clarity ID | |
| (10) | ECMS ID | |
| (11) | PCM Record | |
| (12) | Testing Date | |
| (13) | Implementation Date | |
| (14) | Requesting Line of Business | LoB1 / LoB2 / LoB3 / LoB4 / LoB5 |
| (15) | Project Type | |
| (16) | Project Phase | |
| (17) | Outside Counsel Review | |
| (18) | Project Sponsor Email | |
| (19) | Change Manager Email | |
| (20) | Technology Delivery Manager Email | |
| (21) | Legal Partner Email | |
| (22) | Compliance Partner Email | |
| (23) | Risk Partner Email | |
| (24) | Business Areas Impacted | |
| (25) | Related to Transition | If Yes |
| (26) | Involve AML/KYC | |
| (27) | Are you aware of client contractual restrictions? | |
| (28) | Who can confirm these restrictions? | |
| (29) | Are mitigating controls in place for these restrictions? | Explain |

| | | | | |
|---|---|---|---|---|
| (30) | Does this project involve customer/client date of any type? | | | |
| (31) | Is this project subject to Banking or Securities Regulations? | | | |
| (32) | Source Countries | | Target Countries | |
| | Argentine | | Argentine | |
| | Australia | | Australia | |
| | Austria | | Austria | |
| | Bahrain | | Bahrain | |
| | Belgium | | Belgium | |
| | Brazil | | Brazil | |
| | Canada | | Canada | |
| | Cayman Islands | | Cayman Islands | |
| | Chile | | Chile | |
| | People's Republic Of China (PRC) | | People's Republic Of China (PRC) | |
| | Columbia | | Columbia | |
| | Costa Rica | | Costa Rica | |
| | Czech Republic | | Czech Republic | |
| | Denmark | | Denmark | |
| | Finland | | Finland | |
| | France | | France | |
| | Germany | | Germany | |
| | Greece | | Greece | |
| | Hong Kong | | Hong Kong | |
| | Hungary | | Hungary | |
| | India | | India | |
| | Indonesia | | Indonesia | |
| | Ireland | | Ireland | |
| | Isle of Man | | Isle of Man | |
| | Israel | | Israel | |
| | Italy | | Italy | |
| | Japan | | Japan | |
| | Jersey | | Jersey | |
| | Korea | | Korea | |
| | Lebanon | | Lebanon | |
| | Luxembourg | | Luxembourg | |
| | Malaysia | | Malaysia | |
| | Mexico | | Mexico | |
| | Monaco | | Monaco | |
| | Netherlands | | Netherlands | |
| | Norway | | Norway | |
| | Panama | | Panama | |
| | Philippines | | Philippines | |
| | Portugal | | Portugal | |
| | Romania | | Romania | |
| | Russia | | Russia | |
| | Saudi Arabia | | Saudi Arabia | |
| | Singapore | | Singapore | |
| | Slovakia | | Slovakia | |
| | South Africa | | South Africa | |
| | Spain | | Spain | |
| | Sweden | | Sweden | |
| | Switzerland | | Switzerland | |
| | Taiwan | | Taiwan | |
| | Thailand | | Thailand | |
| | Turkey | | Turkey | |
| | United Arab Emirates (inc DIFC) | | United Arab Emirates (inc DIFC) | |
| | United Kingdom | | United Kingdom | |
| | United States | | United States | |
| | Uruguay | | Uruguay | |
| | Vietnam | | Vietnam | |
| | Number of Countries | | Number of Countries | |

FIG. 6A

| | Weighting | R1 A | R2 B | R3 C | R3 D | R1 E | R1 F | R2 G | R1 H | R3 I | R3 J | R1 K | R3 | R2 | R2 |
|---|---|---|---|---|---|---|---|---|---|---|---|---|---|---|---|
| Region | | | | | | | | | | | | | | | |
| Jurisdiction | | L | L | L | L | H | L | L | L | L | L | L | L | M | N |
| Complexity (H/L) | | 3 | 26 | 0 | 2 | 4 | 1 | 8 | 1 | 7 | 0 | 0 | 0 | 2 | 6 |
| Legal Entities | | Y | N | N | Y | N | N | N | N | Y | Y | N | Y | N | N |
| TBDA's Required | | 0 | 3 | 0 | 0 | 9 | 0 | 12 | 12 | 0 | 0 | 0 | 0 | 0 | 15 |
| Data Volume | | 101 | 65 | 34 | 35 | 182 | 14 | 128 | 38 | 101 | 34 | 32 | 13 | 176 | 59 |
| Business Criticality | | 93 | 36 | 87 | 111 | 111 | 87 | 30 | 6 | 117 | 12 | 6 | 6 | 198 | 87 |
| External Factors | | | | | | | | | | | | | | | |
| Data Privacy | 9 | Y | Y | N | Y | Y | N | Y | N | Y | Y | N | Y | Y | N |
| Bank Secrecy | 9 | Y | Y | Y | Y | Y | Y | Y | Y | N | Y | Y | Y | Y | Y |
| Outsourcing | 9 | Y | Y | N | Y | Y | N | Y | N | Y | N | Y | Y | Y | Y |
| Regulatory Notification | 3 | N | N | N | N | N | Y | N | N | N | N | N | N | N | N |
| Regulatory Approval | 9 | N | N | N | N | N | N | N | N | N | Y | N | Y | N | N |
| Customer Notification | 3 | Y | Y | N | Y | Y | N | N | Y | Y | Y | N | Y | Y | Y |
| Customer Consent | 9 | Y | N | Y | N | N | N | N | N | N | N | N | N | N | N |
| Associate Signature Required | 1 | N | N | N | N | N | N | N | N | N | N | N | N | N | N |
| Special Business Conditions | 3 | N | N | N | N | N | N | N | N | N | N | N | N | N | N |
| Regulatory Notification | 3 | N | N | N | N | N | N | N | N | N | N | N | N | N | N |
| Regulatory Approval | 9 | N | N | N | N | N | Y | N | N | N | N | Y | N | Y | N |
| Customer Notification | 3 | N | Y | Y | N | N | N | N | N | N | N | N | N | N | N |
| Customer Consent | 9 | Y | N | Y | Y | Y | Y | N | Y | Y | Y | Y | Y | Y | Y |
| Associate Signature Required | 1 | N | N | N | N | N | N | N | N | N | N | N | N | N | N |
| Special Business Conditions | 3 | N | N | N | N | N | N | Y | N | N | Y | N | Y | Y | N |
| Regulatory Notification | 3 | N | N | N | N | N | N | N | N | N | N | N | N | N | N |
| Regulatory Approval | 9 | Y | N | N | N | N | N | N | N | N | N | N | N | N | N |
| Customer Notification | 3 | N | N | N | N | N | N | N | N | N | N | N | N | N | N |
| Customer Consent | 9 | N | N | N | N | N | N | N | N | N | N | N | N | N | N |
| Associate Signature Required | 1 | N | N | Y | N | N | N | N | N | N | N | N | N | Y | Y |
| Special Business Conditions | 3 | N | Y | N | Y | N | Y | Y | N | Y | Y | N | N | N | Y |

TO FIG. 6B

FROM FIG. 6A

| | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| Data Center Location | 3 | N | O | Y | 3 | N | O | N | O | N | O | Y | 3 | N | O | N | O | N | O | N | O | N | O | N | O | N | O | N | O | N | O | Y | 3 |
| Large Operations Location | 9 | N | O | N | O | N | O | N | O | Y | 9 | Y | 9 | N | O | N | O | N | O | N | O | N | O | N | O | N | O | N | O | Y | 9 |
| Critical Outsourcing Location | 3 | N | O | N | O | N | O | N | O | N | O | N | O | Y | 3 | N | O | N | O | N | O | N | O | N | O | N | O | Y | 3 |
| New Market Entry/Expansion | 9 | N | O | N | O | N | O | N | O | N | O | N | O | N | O | N | O | N | O | N | O | N | O | Y | 81 | N | 0 |
| Client Volume | 1 | H | 9 | H | 9 | M | 3 | M | 3 | L | 1 | H | 9 | L | 1 | H | 9 | L | 1 | L | 1 | L | 1 | H | 9 | M | 3 |
| # of Lines of Business | 3 | 2 | 2 | 2 | 2 | 1 | 1 | 2 | 2 | 1 | 1 | 2 | 2 | 1 | 1 | 2 | 2 | 1 | 1 | 1 | 1 | 0 | 0 | 2 | 2 | 2 | 2 |
| Revenue | 9 | H | 81 | M | 27 | M | 27 | M | 27 | H | 81 | L | 9 | H | 81 | H | 81 | M | 27 | L | 9 | L | 9 | H | 81 | M | 27 |
| Associate Population | 3 | M | 9 | H | 27 | L | 3 | L | 3 | L | 3 | L | 3 | M | 9 | M | 9 | L | 3 | L | 3 | L | 3 | L | 3 | H | 27 |
| Statutory Damages | 3 | M | 9 | H | 27 | L | 3 | H | 27 | L | 3 | M | 9 | H | 27 | M | 9 | M | 9 | L | 3 | L | 3 | M | 9 | L | 3 |
| Criminal Penalties | 9 | Y | 81 | N | 0 | Y | 81 | Y | 81 | N | 0 | N | 0 | Y | 81 | Y | 81 | N | 0 | N | 0 | N | 0 | Y | 81 | Y | 81 |
| "Hot" Country | 9 | N | 0 | N | 0 | N | 0 | N | 0 | N | 0 | N | 0 | N | 0 | N | 0 | N | 0 | N | 0 | N | 0 | Y | 81 | N | 0 |
| Regulatory Interaction | 3 | L | 3 | M | 9 | L | 3 | L | 3 | H | 27 | L | 3 | M | 9 | H | 27 | L | 3 | L | 3 | L | 3 | H | 27 | L | 3 |
| | | 254 | 236 | 236 | 146 | 146 | 139 | 139 | 194 | 194 | 347 | 347 | 143 | 143 | 212 | 212 | 83 | 83 | 248 | 248 | 94 | 94 | 74 | 74 | 61 | 61 | 440 | 440 | 215 | 215 |

FIG. 7A (PII = PERSONALLY IDENTIFIABLE INFORMATION/PERSONAL DATA)

415a

| RULE | JURISDICTION | RULE TYPE | ATTRIBUTE | WHEN CONDITION | THEN ACTION | ELSE/END |
|------|--------------|-----------|-----------|----------------|-------------|----------|
| 1.0 | JURISDICTION A | DATA PRIVACY | MOVE PII DATA | REGULATORY RESTRICTIONS PRESENT | DETERMINE SPECIFIC RESTRICTIONS | 2.0 |
| 2.0 | JURISDICTION A | DATA PRIVACY | MOVE PII DATA | SENSITIVE DATA ELEMENTS ARE INVOLVED | DEFINE SENSITIVE DATA ELEMENTS | 2.1 |
| 2.1 | JURISDICTION A | DATA PRIVACY | MOVE PII DATA | SENSITIVE DATA ELEMENTS ARE PRESENT IN PROJECT REQUEST | DETERMINE REGULATORY COMPLIANCE REQUIREMENTS | 2.2 |
| 2.2 | JURISDICTION A | DATA PRIVACY | MOVE PII DATA | COMPLIANCE REQUIREMENTS EXIST | DEFINE REQUIREMENTS | 2.2a |
| 2.2a | JURISDICTION A | DATA PRIVACY | MOVE PII DATA | CUSTOMER NOTICE REQUIRED | DELIVER CUSTOMER NOTICE | END |

(PII=PERSONALLY IDENTIFIABLE INFORMATION/PERSONAL DATA)

415b

| RULE | JURISDICTION | RULE TYPE | ATTRIBUTE | WHEN CONDITION | THEN ACTION | ELSE/END |
|---|---|---|---|---|---|---|
| 1.0 | JURISDICTION A | DATA PRIVACY | MOVE PII DATA | REGULATORY RESTRICTIONS PRESENT | DETERMINE SPECIFIC RESTRICTIONS | 2.0 |
| 2.0 | JURISDICTION A | DATA PRIVACY | MOVE PII DATA | SENSITIVE DATA ELEMENTS ARE INVOLVED | DEFINE SENSITIVE DATA ELEMENTS | 2.1 |
| 2.1 | JURISDICTION A | DATA PRIVACY | MOVE PII DATA | SENSITIVE DATA ELEMENTS ARE PRESENT IN PROJECT REQUEST | DETERMINE REGULATORY COMPLIANCE REQUIREMENTS | 2.2 |
| 2.2 | JURISDICTION A | DATA PRIVACY | MOVE PII DATA | COMPLIANCE REQUIREMENTS EXIST | DEFINE REQUIREMENTS | 2.2a |
| 2.2a | JURISDICTION A | DATA PRIVACY | MOVE PII DATA | CUSTOMER CONSENT REQUIRED | VALIDATE CUSTOMER CONSENT IS ON FILE | YES 2.3 NO 2.2b |
| 2.2b | JURISDICTION A | DATA PRIVACY | MOVE PII DATA | CUSTOMER CONSENT REQUIRED | OBTAIN CUSTOMER CONSENT | 2.3 |
| 2.3 | JURISDICTION A | DATA PRIVACY | MOVE PII DATA | CUSTOMER CONSENT IS ON HAND | OBTAIN REGULATORY NOTIFICATION | 2.4 |
| 2.4 | JURISDICTION A | DATA PRIVACY | MOVE PII DATA | REGULATORY NOTIFICATION REQUIRED | FILE WITH XYZ REGULATOR | END |

*FIG. 7B*

Project Name ☐
Project Overview

Risk Summary

Country Complexity ☐ # of High Complexity ☐ # of Low Complexity
Data Volume ☐ # of High Countries ☐ # of Medium Countries ☐ # of "Hot" Complexity
Business Criticality ☐ # of High Countries ☐ # of Medium Countries ☐ # of Low Countries
External Factors ☐ # of High Countries ☐ # of Medium Countries ☐ # of Low Countries
Country Revenue ☐ # of High Countries ☐ # of Medium Countries ☐ # of Low Countries
Inherent Project Level Risk ☐ # of High Countries ☐ # of Medium Countries ☐ # of Low Countries

~6700

RISK FACTORS 6710

| Country | Regulation | Action Required | Assigned To | Completion Time | Country Complexity (H,L) | Data Volume (H,M,L) | Business Criticality (H,M,L) | External Factors (H,M,L) | Revenue (H,M,L) |
|---|---|---|---|---|---|---|---|---|---|
| Jurisdiction A | Data Privacy | File w/ XYZ Regulator | Mr. Person | One Month | L | L | H | H | M |
| ... | ... | ... | ... | ... | ... | ... | ... | ... | ... |

Critical Assumptions

Key Risks

Critical Actions

Recommendations

Residual Risk ☐   Legal Review ☐   Compliance Review ☐   LOB Review ☐   Final Decision ☐

*FIG. 8*

INTERNATIONAL CROSS BORDER DATA MOVEMENT

RELATED APPLICATIONS

Pursuant to 35 U.S.C. §119 (e), this application claims priority to U.S. Provisional Patent Application Ser. No. 61/329,724, entitled INTERNATIONAL CROSS BORDER DATA MOVEMENT, filed Apr. 30, 2010. U.S. Provisional Patent Application Ser. No. 61/329,724 is hereby incorporated by reference in its entirety.

TECHNICAL FIELD

The present disclosure relates to data movement generally and more specifically to international cross border data movement.

BACKGROUND

Some jurisdictions may restrict an organization's ability to export certain types of data. These jurisdictions may promulgate regulations that either prohibit exportation of certain types of data or allow exportation subject to specified restrictions. The extent and complexity of these regulations may differ among jurisdictions.

SUMMARY

In some embodiments, a data movement system comprises a memory and a processor. The memory is operable to store a request to move data from a first jurisdiction and at least one action item associated with the request to move data, the request to move data comprising (a) a data type, (b) a jurisdiction from which the data is to be moved, and (c) a purpose for moving the data. The processor is configured to receive an update to the request to move data, the update to the request changing at least one of the data type, the jurisdiction from which the data is to be moved, or the purpose for moving the data. The processor is configured to identify a set of data movement rules based at least in part upon the updated request to move data. The processor is configured to apply at least one rule of the set of data movement rules to identify an update to the at least one action item to be completed in order to comply at least in part with the regulations.

Certain embodiments may provide one or more technical advantages. A technical advantage of one embodiment may include the capability to identify inherent risk associated with moving data out of one or more jurisdictions. A technical advantage of one embodiment may include the capability to identify action items in furtherance of regulatory compliance. A technical advantage of one embodiment may include the capability to reduce risk associated with moving data out of a jurisdiction by identifying and completing action items. A technical advantage of one embodiment may include the capability to provide a quantitative expression of inherent risk that may allow an organization to appropriately allocate resources towards minimizing the organization's risk in that jurisdiction. A technical advantage of one embodiment may include the capability to improve organization knowledge of project history and provide a trail for evaluators to assess the organization's compliance with jurisdictional regulations.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which:

FIGS. 5A-5D show example request forms according to one embodiment;

FIG. 6 shows a jurisdictional matrix according to one embodiment;

FIGS. 7A and 7B shows example decision grids for applying rules to a request according to several embodiments; and FIG. 8 shows an example project summary according to one embodiment.

DETAILED DESCRIPTION

Figure 1:
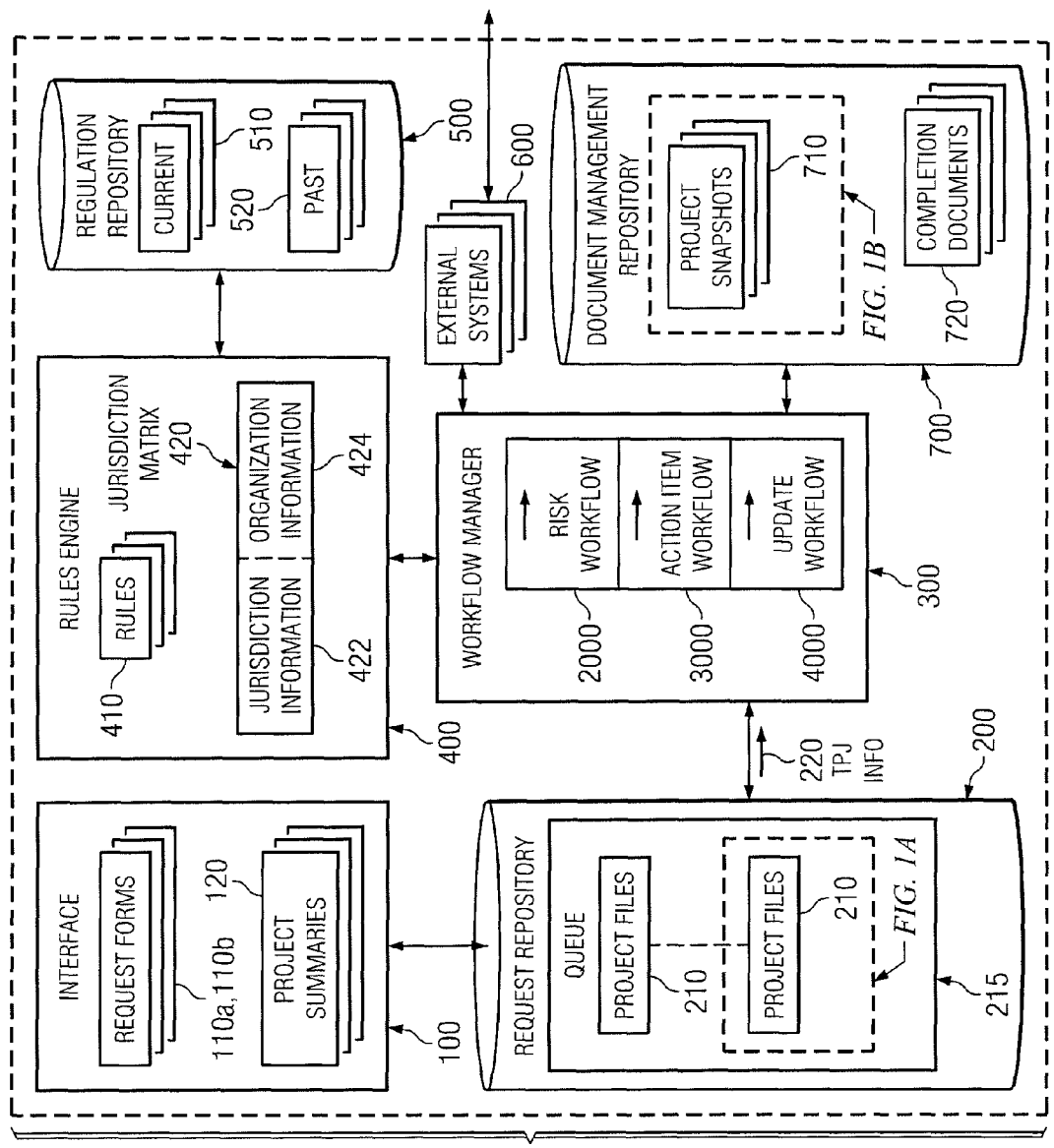
FIG. 1 shows a data movement system according to one embodiment.
Figure 1:
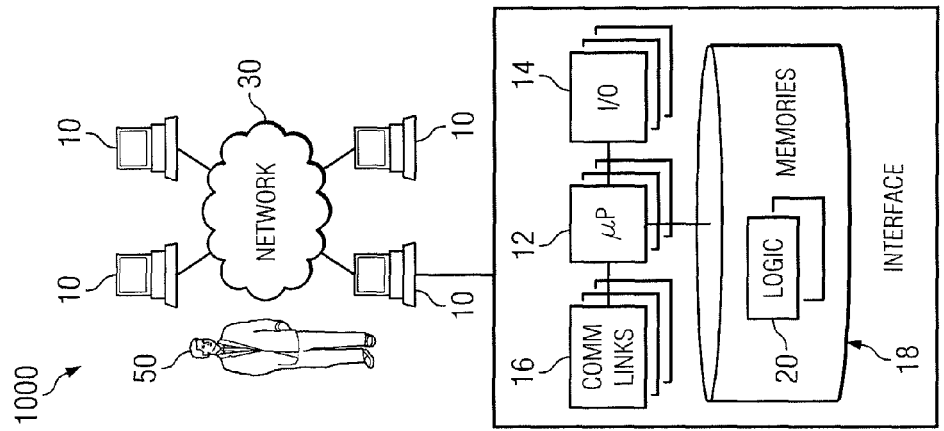

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

An organization may conduct activities and store data in multiple jurisdictions throughout the world. An organization may include any social arrangement that pursues collective goals. One example of an organization is a business. A business is an organization designed to provide goods or services, or both, to consumers, governmental entities, and other businesses. Examples of a business may include, but are not limited to, agriculture and mining businesses, financial institutions, manufacturers, real estate companies, retailers and distributors, service businesses, transportation companies, and utility companies. A business may include both for-profit and not-for-profit businesses. An organization may also include multiple businesses. For example, an organization may control businesses in multiple jurisdictions throughout the world. Examples of organizations are not limited to businesses. For example, an organization can itself be a government entity.

Some jurisdictions may restrict an organization's ability to export certain types of data. These jurisdictions may promulgate regulations that either prohibit exportation of certain types of data or allow exportation subject to specified restrictions. The extent and complexity of these regulations may differ among jurisdictions. For example, an organization may store personally-identifiable information in ten different jurisdictions, and each of them may have different restrictions on the organization's ability to move the personally-identifiable information. In another example, the ten different jurisdictions may have different definitions as to what constitutes personally-identifiable information (e.g., jurisdictions may disagree as to whether an individual's job title is personally-identifiable information).

Teachings of certain embodiments recognize the ability for an organization with a past, current, or future data-movement project to identify inherent risk associated with moving data out of one or more jurisdictions. Returning to the last example, teachings of certain embodiments recognize the ability to quantitatively assess risk associated with exporting data out of one or all of the ten jurisdictions. Teachings of certain embodiments also recognize the ability to identify action items in furtherance of regulatory compliance. Returning to the last example, teachings of certain embodiments recognize the ability to identify actions that the organization may take in a step toward compliance with governing regulations (e.g., actions required for compliance with a jurisdiction's data-movement regulations).

As used throughout, a data-movement project may include any project that involves moving data out of at least one jurisdiction. A data-movement project may be associated with one or more requests to move data. A request to transfer data may include any information regarding a past, present, or proposed movement of data out of a jurisdiction. A request to transfer data may include both one-time and recurring data movements. A jurisdiction includes any territory or legal division that may have regulations restricting exportation of data out of the jurisdiction. Examples of jurisdictions may include, but are not limited to, countries, states, dependencies (e.g., the Isle of Man), territories (e.g., the Cayman Islands), unions (e.g., the European Union), and other national and international organizations. Data may refer to either plural data or singular datum.

Figure 1A:
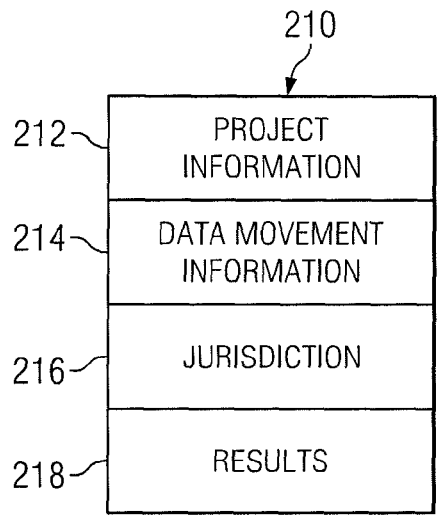
FIG. 1A shows an example project file of FIG. 1 according to one embodiment.
Figure 1B:
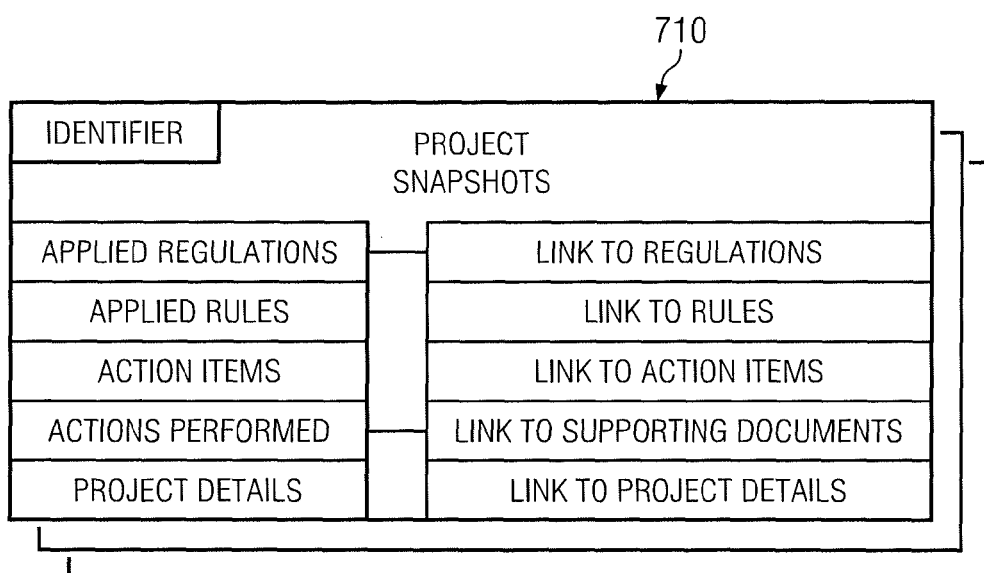
FIG. 1B shows an example project snapshot of FIG. 1 according to one embodiment.

FIG. 1 shows a data movement system 1000 according to one embodiment. FIG. 1A shows an example project file 210 of FIG. 1 according to one embodiment. FIG. 1B shows an example project snapshot 710 of FIG. 1 according to one embodiment.

In general, system 1000 receives requests to transfer data out of one or more jurisdictions and then aids in determining jurisdictional restrictions on transferring the data. These requests to transfer data are associated with data-movement projects, which may include any effort by the organization to move data.

In some embodiments, system 1000 may identify inherent risk associated with moving data out of one or more jurisdictions. Two example types of risk are jurisdiction risk and project risk. Jurisdiction risk may approximately express the inherent risk associated with moving data out of a jurisdiction. For example, a jurisdiction with a highly complex regulatory structure may add to inherent risk because of the possibility that the organization fails to comply with the regulations of the jurisdiction. A jurisdiction in which the organization's exposure is high may add to inherent risk because of the ramifications to the organization for failure to comply with the regulations of the jurisdiction. Teachings of certain embodiments recognize that a quantitative expression of inherent risk may allow an organization to appropriately allocate resources towards minimizing the organization's risk in that jurisdiction. If the inherent risk associated with a jurisdiction is unmanageable, the organization may even decide to abandon efforts to move data out of the jurisdiction.

Project risk may approximately express the inherent risk associated with moving data out of each of the jurisdictions identified in the data-movement project. For example, a project with a higher project risk may indicate that the project includes a large number of jurisdictions with a highly complex regulatory structure and/or a large number of jurisdictions where the organization's exposure is high. Teachings of certain embodiments recognize that a quantitative expression of inherent project risk may allow an organization to appropriately allocate resources towards minimizing the organization's risk associated with that project. If the inherent project risk associated with the project is unmanageable, the organization may even decide to abandon the project.

In some embodiments, system 1000 may also identify action items required for regulatory compliance. As one example, if a jurisdiction requires outsourcing agreements with third parties to include certain terms, then system 1000 may analyze a project to determine whether the organization needs to include the certain terms in its outsourcing agreements. Teachings of certain embodiments recognize that identifying action items and completing those action items may reduce risk associated with moving data out of a jurisdiction. Thus, if a jurisdiction has a high inherent jurisdiction risk or a project has a high inherent project risk, identifying and completing action items may mitigate risk. In this manner, identifying and completing action items may be analogous to an internal control system for minimizing risk.

An internal control may include any process effected by an organization that is designed to accomplish specific goals or objectives, such as reducing risk. Teachings of certain embodiments also recognize the ability to manage and track execution of action items as an additional mechanism for monitoring and mitigating risk. Action items may include specific actions that an organization may take to comply with a rule or regulation, or to otherwise mitigate risk associated with moving data out of a jurisdiction. Action items may be managed and tracked over time. For example, action items may include recurring actions to be completed, and action items may change over time due to changes in the project or changes in any governing regulations. Teachings of certain embodiments also recognize that tracking execution of action items may allow an evaluator to later confirm that the project is complying with any governing regulations.

The example system 1000 of FIG. 1 features an interface 100, a request repository 200, a workflow manager 300, a rules engine 400, a regulation repository 500, external systems 600, and a document management repository 700, that may be implemented by one or more computer systems 10.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although system 1000 shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Interface 100 may include any interface accessible by a user, such as a user 50. User 50 may include any individual, group of individuals, entity, machine, and/or mechanism that interacts with interface 100. Examples of users 5 include, but are not limited to, a manager, executive, review board, accountant, engineer, technician, contractor, agent, and/or employee or representative of an organization.

Interface 100 may include one or more forms for receiving information from user 50 and/or providing information to user 50 relating to a data-movement project. A data-movement project may include any project that involves moving data out of at least one jurisdiction. As one example, a data-movement project may involve moving data from a first jurisdiction to a second jurisdiction. As another example, a data-movement project may involve sharing data among multiple jurisdictions. Data-movement projects may include both one-time and recurring movements of data.

Data-movement projects may move data for any suitable purpose. As one example, a data-movement project may allow multiple business units or lines of business of an organization to share data housed in different jurisdictions. In this example, interface 100 may receive any information useful in determining whether and how the data-movement project implicates data privacy regulations promulgated by the different jurisdictions. Data privacy involves the relationship between collection and dissemination of data, technology, the public expectation of privacy, and the legal and political issues surrounding them. Example data privacy regulations may include, but are not limited to, regulations restricting the collection and movement of personally identifiable information, which may be received from sources such as healthcare records, criminal justice investigations and proceedings, financial institutions and transactions, biological traits and genetic material, residence and geographic records, and ethnicity.

As another example, data may be moved out of a jurisdiction in order to comply with a request from outside the organization, such as a subpoena. In this example, interface 100 may receive any information useful in determining whether and how the data-movement project implicates data secrecy regulations promulgated by the jurisdiction. Data secrecy involves ensuring that information is accessible only to those authorized to have access. One example of data secrecy is bank secrecy. Bank secrecy is a legal principle in some jurisdictions under which financial institutions are not allowed to provide to authorities personal and account information about their customers unless certain conditions apply. For example, bank secrecy regulations are prevalent in countries such as Switzerland, Singapore, and Luxembourg.

As yet another example, a data-movement project may involve outsourcing data out of a jurisdiction to an external organization, such as a third-party data processor. In this example, interface 100 may receive any information useful in determining whether and how the data-movement project implicates outsourcing regulations promulgated by the jurisdiction. Outsourcing involves the practice of hiring an external organization to perform some functions using an organization's data. Outsourcing regulations may include restrictions on what data may be outsourced and restrictions stipulating how outsourced data must be handled.

In one embodiment, interface 100 includes one or more request forms 110a and 110b and one or more project summaries 120. Example request forms 110a and 110b are shown in FIGS. 5A-5D, and an example project summary 120 is shown in FIG. 8.

Request forms 110a and 110b provide a form for receiving information regarding requests to transfer data out of one or more jurisdictions. In one embodiment, information received through request forms 110a and 110b is stored in a project file 210 in request repository 200. In this example embodiment of FIG. 1A, the information received through request forms 110a and 110b includes project information 212, data movement information 214, and jurisdiction information 216. Project information 212 may include any information regarding a data-movement project, such as a project name, a project identifier, a requestor name and contact information, and a project type. Data movement information 214 may include any information regarding the proposed data movement, such as a type of data to be moved, a purpose for the data movement, and information identifying whether the data movement will be one-time or recurring. Examples of data type may include personal data (e.g., customer, client, or associate specific identifiable data), background data, transaction data (e.g., individual transaction level data), government data (e.g., data about or controlled by a sovereign entity), medical data (e.g., information containing personal medical records), sensitive data (e.g., religious or political affiliations), and anti-money laundering information (e.g., trending to identify anti-money laundering transactions). Teachings of certain embodiments recognize that categories of data types may differ among jurisdictions. As one example, some jurisdictions consider an individual's job title to be personally-identifiable information, whereas other jurisdictions do not. Examples of movement purposes include anti-money laundering, sales, servicing, marketing, financial reporting, fulfillment, data storage, testing, associate access, reporting, processing, and document storage. Jurisdiction information 216 may include information identifying one or more jurisdictions hosting the data to be moved. Additional examples of request forms 110a and 110b, project information 212, data movement 214, and jurisdiction information 216 are described with respect to FIGS. 5A-5D.

Referring back to FIG. 1, project summary 120 provides a form for reporting information regarding requests to transfer data out of one or more jurisdictions. In one example, such reported information includes the project information 212, the data movement information 214, the jurisdiction information 216, and results information 218. Results information 218 may include any information regarding jurisdictional restrictions on transferring the data, such as information regarding regulations promulgated by one or more jurisdictions, actions that facilitate with the regulations promulgated by one or more jurisdictions (e.g., action items), and actions completed towards compliance with the regulations promulgated by one or more jurisdictions. Examples of the regulations promulgated by one or more jurisdictions include current regulations 510 and past regulations 520, which is described in greater detail with regard to regulation repository 500. Additional examples of project summary 120, project information 212, data movement 214, jurisdiction information 216, and results information 218 are described with respect to FIG. 8.

Request repository 200 may include any repository for storing information regarding requests to transfer data out of one or more jurisdiction. In the illustrated embodiment, request repository 200 stores one or more project files 210. Each project file 210 includes information regarding one request to transfer data out of one or more jurisdictions. Each project file 210 may also be assigned a unique record locator for identifying the project file 210. In the illustrated embodiment, project file 210 information includes project information 212, data movement information 214, jurisdiction information 216, and results information 218. Request repository 200 may receive project information 212, data movement information 214, and jurisdiction information 216 from interface 100 and may receive results information 218 from workflow manager 300.

In some embodiments, project files 210 may be ordered in a queue for processing. Project files 210 may be arranged in any suitable order. In one embodiment, project files 210 are arranged according to a time stamp (e.g., in the order received). In some embodiments, a user 50 associated with the organization may manually change the order of project files 210 within queue 215. In another embodiment, project files 210 are automatically prioritized according to factors such as project type (e.g., proposed or active), data type, project deadlines, line of business, number of jurisdictions, regulation complexity, project purpose, project phase and/or project risk. One example of overall project risk is described with regards to FIG. 2, which shows a risk workflow 2000 for calculating jurisdictional risk and project risk.

In one embodiment, request repository 200 may provide T-P-J information 220 to workflow manager 300. In this example, T-P-J information 220 includes three types of information about a project: a data type, a project purpose, and a jurisdiction hosting the data. T-P-J information 220 may be extracted from one or more project files 210. Workflow manager 300 may use at least some of the T-P-J information 220 as inputs to one or more workflows.

The illustrated embodiment features three example workflows: risk workflow 2000, an action item workflow 3000 for identifying action items that facilitate regulatory compliance, and an update workflow 4000 for updating jurisdictional restrictions on a project. As one example, risk workflow 2000 may assess risk for a project that involves moving first data from a first jurisdiction and second data from a second jurisdiction. The first and second jurisdictions may be identified by T-P-J information 220, and the regulations of those jurisdictions may be collected from current regulations 510 stored on regulatory repository 500. Risk workflow 2000 may also use rules 410 in lieu of or in addition to current regulations 510. In this example, the project may be determined based on the jurisdictional complexity of the project and the jurisdictional exposure of the project. The jurisdictional complexity of the project may be determined based on the regulations of the first jurisdiction and the second jurisdiction. The jurisdictional exposure of the project may also be determined based on the organization's volume of business activity in the first jurisdiction and the second jurisdiction.

As another example, action item workflow 3000 may determine information for moving data from one or more jurisdictions. T-P-J information 220 may identify request information including a data type, a jurisdiction from which the data is to be moved, and a purpose for moving the data. A set of data movement rules may be identified and applied against the request to identify an action item to be completed in order to comply at least in part with the regulations.

As yet another example, update workflow 4000 may update jurisdictional information for a project that involves moving data from a first jurisdiction. T-P-J information 220 may identify request information including a data type, a jurisdiction from which the data is to be moved, and a purpose for moving the data. An update to the request may be received changing some part of the T-P-J information 220. A set of data movement rules may be identified and applied against the updated request to identify an updated action item to be completed in order to comply at least in part with the regulations.

As yet another example, update workflow 4000 may update jurisdictional information for moving data across jurisdictional borders. T-P-J information 220 may identify request information including a data type, a jurisdiction from which the data is to be moved, and a purpose for moving the data. An update to the rules associated with the jurisdiction may be received. The update may represent a change to at least one regulation of the jurisdiction. The updated data movement-rules may be applied against the request to identify an updated action item to be completed in order to comply at least in part with the regulations.

Figure 2:
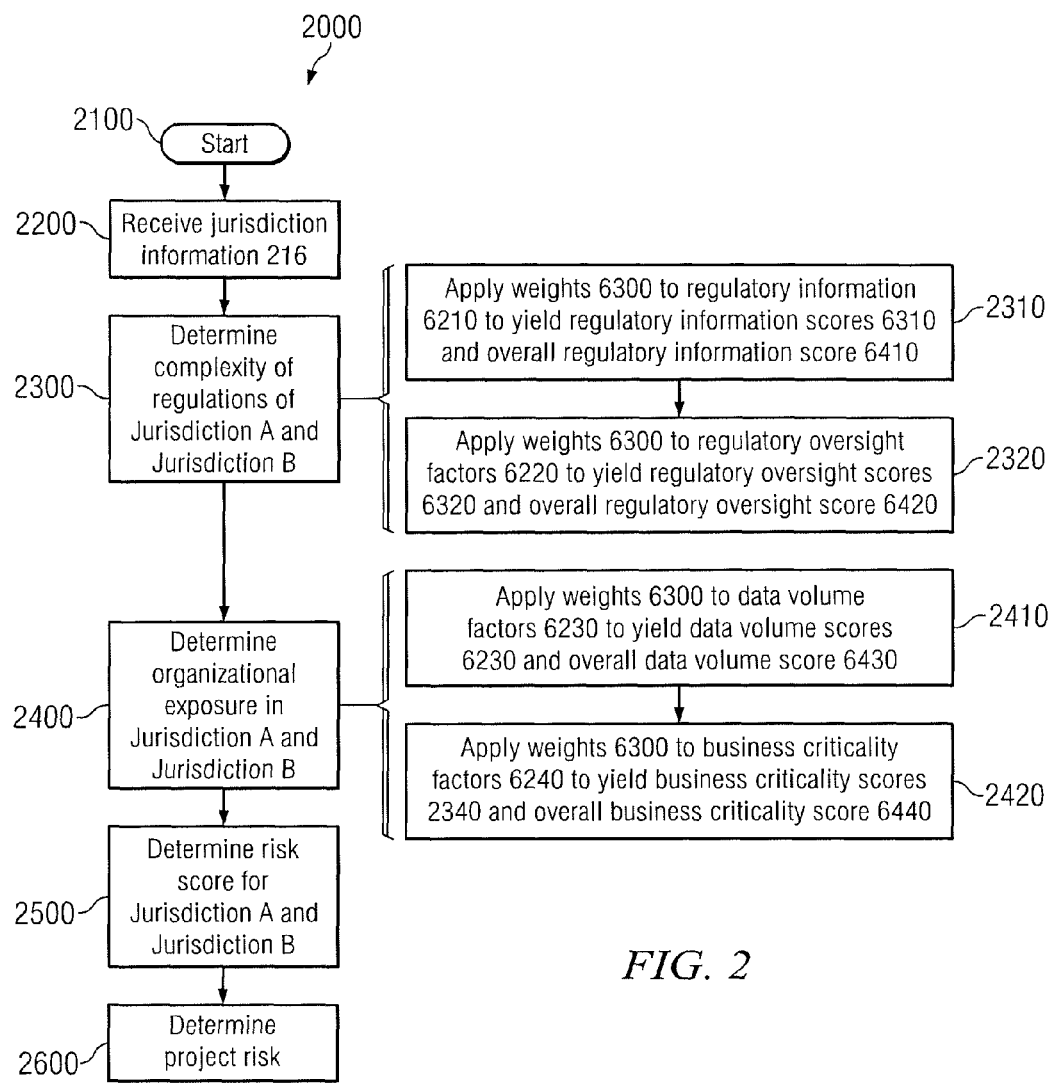
FIG. 2 shows a risk workflow according to one embodiment.
Figure 3:
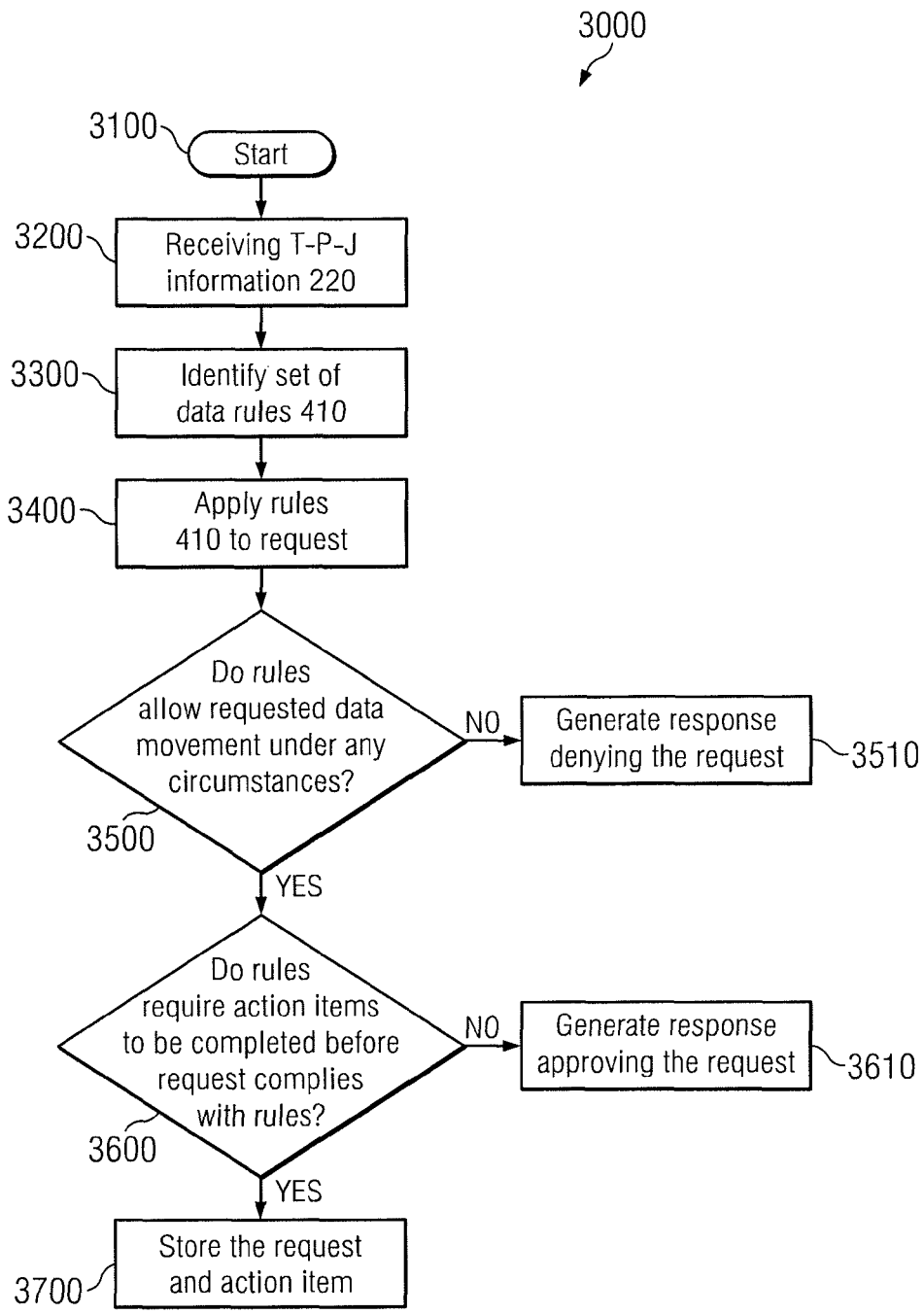
FIG. 3 shows an action item workflow according to one embodiment.
Figure 4:
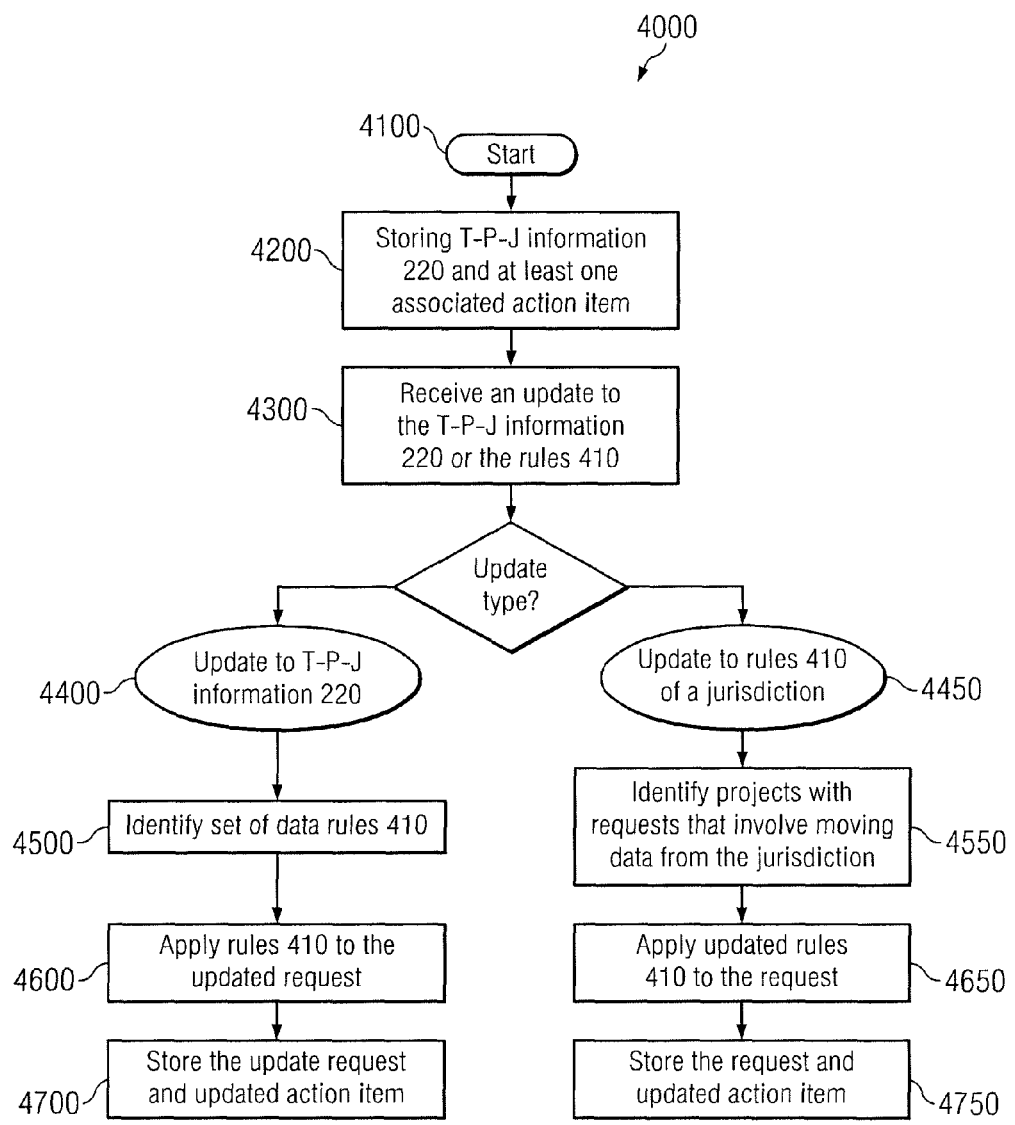
FIG. 4 shows an update workflow according to one embodiment.

Risk workflow 2000, action item workflow 3000, and update workflow 4000 are described in greater detail with regards to FIGS. 2, 3, and 4.

Rules engine 400 stores and applies rules 410. Rules 410 are associated with regulations of a jurisdiction. In the illustrated embodiment, rules 410 are developed from current regulations 510 stored in a regulation repository 500. Rules 410 may be developed dynamically from regulations 510 or may be compiled ahead of time based on regulations 510. In one embodiment, rules 410 may include if/then/else scenarios developed from regulations 510 to identify whether and/or how the regulations restrict movement of data out of a jurisdiction. Teachings of certain embodiments recognize that rules 410 may provide a structured mechanism for applying regulations of a jurisdiction to a project and may reduce the need to refer to the regulations directly. In one example, a regulation may be relevant if the project involves moving "data type A" data. In this example, a regulation may apply to data type A, and a corresponding rule may be applied against those projects that have data type=data type A. Thus, in this example, the relevant rule may be identified without searching the regulations for regulations that may implicate "data type A" data. Example rules 410 are described in greater detail with regard to FIGS. 7A and 7B.

Rules engine 400 may also store a jurisdiction matrix 420. Jurisdiction matrix 420 provides a snapshot view of multiple jurisdictions, the jurisdiction risk scores associated with the multiple jurisdictions, and a list of those factors and corresponding weights that are used to determine the jurisdiction risk scores. Thus, a jurisdiction matrix 420 may aggregate information assessing inherent risk associated with an organization that operates in a jurisdiction and may move data out of that jurisdiction. Jurisdiction matrix 420 includes at least two categories of information: jurisdiction information 422 and organization information 424. Jurisdiction information 422 includes information regarding regulatory complexity of the jurisdiction and/or the jurisdiction's penalties for failing to comply with the jurisdiction's regulations. Organization information 424 includes information regarding an organization's exposure in the jurisdiction. Organization information 424 may include, for example, the organization's volume of business activity in the jurisdiction and/or the organization's volume of data in the jurisdiction. In some embodiments, jurisdiction matrix 420 may be populated dynamically by reference to rules 410 or compiled ahead of time based on rules 410 or regulations 510. For example, in one embodiment, rules 410 are applied to jurisdiction information in a manner similar to that described with regard to action item workflow 3000 to determine whether rules exist restricting data movement in a variety of regulatory arenas but without actually analyzing individual project information to identify action items. An example jurisdiction matrix 420 is described in greater detail with regard to FIG. 6.

Regulatory repository 500 may include any repository for storing regulations promulgated by one or more jurisdictions. In the illustrated embodiment, regulatory repository 500 stores current regulations 510 and past regulations 520. Current regulations 510 are regulations promulgated by a jurisdiction and that are either in effect or expected to be in effect in the future. Past regulations 520 are regulations once promulgated by a jurisdiction but that are no longer effective.

In some embodiments, external systems 600 may facilitate transmitting or receiving information from an organization's information systems. As one example, request forms 110*a* and 110*b* may use external systems 600 to auto-populate information fields. As another example, project snapshots 710 may include references to an organization's document management system, and external systems 600 may be used to access documents stored on the document management system. As yet another example, external systems 600 may transmit information regarding a project to other organizational software tools. As one example, external systems 600 may include an email server configured to send information regarding a project to organizational employees associated with the project.

Document management repository 700 may include any repository for storing project snapshots 710 and completion documents 720. Project snapshots 710 are data records that archive information relating to a project, as described below. Each project snapshot 710 may be associated with a project identifier, a timestamp, and/or a snapshot identifier. Completion documents 720 are documents created during execute of an action item. Each completion document 720 may be associated with a project snapshot 710. For example, a project snapshot 710 that lists completed action items may identify the completion documents 720 that provide evidence that the action items were indeed completed. Project snapshots 710 and completion documents 720 together represent a searchable collection of organizational knowledge regarding past and current projects.

Teachings of certain embodiments recognize that archiving information relating to a project may improve organizational knowledge of project history and provide a trail for evaluators to assess the organization's compliance with jurisdictional regulations. For example, one project may be associated with multiple project snapshots 710 that allow evaluators to review the project at different points at time, such as after set periods of time or after the project or regulations change. An evaluator may review project snapshots 710 for any purpose, such as ascertaining the validity and reliability of the information contained in the project snapshots 710 or evaluating the organization's internal controls.

Returning to FIG. 1B, information archived in project snapshots 710 may include, but is not limited to, regulations applied to the project (e.g., current regulations 510 or past regulations 520), rules applied to the project (e.g., rules 410), action items identified for the project (e.g., action items identified through action item workflow 3000), actions performed in response to the identified action items (e.g., references to completion documents 720), and other project details (e.g., project information 212, data-movement information 214, and jurisdiction 216). Project snapshots 710 may also include references identifying archived information stored elsewhere. As used throughout, references may include any identification of documents or information. As one example, project snapshots 710 may include a reference to current regulations 710 or past regulations 720 without necessarily including copies of those regulations; such references may identify the regulations and/or provide information on how to locate copies of the regulations. As another example, project snapshots 710 may include references to completion documents 720 instead of actual copies of those documents.

Returning back to FIG. 1, completion documents 720 represent documents created during execution of an action item. As one example, if an action item requires the organization to obtain customer consents, then completion documents 720 may include copies of the customer consents. As another example, if an action item requires the organization to enter into outsourcing agreements with third parties subject to certain terms, then completion documents 720 may include a copy of the outsourcing agreements. Teachings of certain embodiments recognize that storing completion documents 720 may allow an evaluator to efficiently assess the organization's compliance with regulations 510. Teachings of certain embodiments also recognize that completion documents 720 may be reused in future projects. For example, if an action item requires the organization to obtain customer consents, a future project may reuse some or all of the stored customer consent documents if facing a similar action item. For example, if the customer consents include language requested by a jurisdiction, then future customer consents used in that jurisdiction may reuse the that language.

A project may be associated with multiple project snapshots 710. For example, a project snapshot 710 may be stored every time a project is updated. Update events may include, but are not limited to, times when action items are identified, when action items are completed, when action items are changed, when regulations or rules have changed, and when any other project information has changed. As one example, if a project is directed to moving data out of a first jurisdiction, a first project snapshot 710 may include a reference to current regulation 510. If the referenced current regulation 510 is replaced with a new regulation, the current regulation 510 may be stored as a past regulation 520, and the new regulation may be stored as a current regulation 510. The first project snapshot 710 would then have a reference to the stored past regulation 520, and a second project snapshot 710 would have a reference to the new current regulation 510.

In operation, according to one embodiment, request forms 110a and 110b are prepared. A user 50 may complete request forms 110a and 110b by providing project information 212, data-movement information 214, and jurisdiction information 216, which may then be stored in a project file 210 on request repository 200. Project files may be organized in a queue 215, and a user 50 may review and prioritize the project files 210 before projects proceed to workflow manager 300. Workflow manager 300 selects a project from project file 210 and receives T-P-J information 220. Using this T-P-J information 220, workflow manager 300 may initiate different workflows. Risk workflow 2000 may populate jurisdiction matrix 420 to calculate jurisdictional risk and project risk based on the organization and the jurisdictions identified by jurisdiction information 216. Action item workflow 3000 may apply rules 410 to the T-P-J information 220 to identify action items required for the project to comply with each jurisdiction's regulations. Update workflow 4000 may update rules 410 and/or action items for the project in response to changes to the jurisdiction's regulations or changes to the T-P-J information 220. Identified action items may be reviewed and validated by a user 50 to ensure they accurately represent the governing regulations. Document management repository 700 may store project snapshots 710, which archive changes and developments to the projects.

FIG. 2 shows risk workflow 2000 according to one embodiment. FIG. 3 shows action item workflow 3000 according to one embodiment. FIG. 4 shows update workflow 4000 according to one embodiment. Workflows 2000, 3000, and 4000 are described with reference to an example data-movement project. The example data-movement project includes an organization's request to move data out of an example Jurisdiction A and an example Jurisdiction B. Workflows 2000, 3000, and 4000 are also described with reference to FIGS. 6-8.

According to one embodiment, workflow 2000 may assess jurisdictional risk and project risk associated with a project that involves moving first data from a first jurisdiction and second data from a second jurisdiction. Jurisdictional risk may approximately express the inherent risk associated with moving data out of a jurisdiction. Project risk may approximately express the inherent risk associated with moving data out of each of the jurisdictions identified in the project.

Risk workflow 2000 starts at step 2100. At step 2200, jurisdiction information 216 is received. In this example, jurisdiction information 216 identifies Jurisdiction A and Jurisdiction B. At step 2300, the complexity of the regulations of Jurisdiction A and Jurisdiction B is determined. In this example, jurisdiction matrix 6000 of FIGS. 6A-6B may be used to determine regulatory complexity. FIGS. 6A-6B will be described in the following paragraphs.

FIGS. 6A-6B shows jurisdictional matrix 6000 according to one embodiment. Jurisdictional matrix 6000 represents one example of the jurisdictional matrix 420 of FIG. 1. In this example embodiment, jurisdictional matrix 6000 includes rows of jurisdictions 6100 and columns of matrix factors 6200. Example jurisdictions 6100 include Jurisdiction A and Jurisdiction B.

Example matrix factors 6200 include regulatory information 6210, regulatory oversight factors 6220, data volume factors 6230, and business criticality factors 6240. Regulatory information 6210 identify whether each jurisdiction 6100 restricts movement of data in the areas of data privacy, secrecy, and outsourcing. Example regulatory information 6210 include requirements related to the regulatory areas of data privacy, data secrecy, and outsourcing.

Regulatory oversight factors 6220 identify the regulatory activity of each jurisdiction 6100 and the penalties that may be incurred for failing to obey regulations of each jurisdiction 6100. Example regulatory oversight factors 6220 include the civil and criminal penalties for failure to comply with data movement regulations and the activity level of the jurisdiction's regulatory body. For example, a jurisdiction that requires many regulatory filings and has an enforcement division may increase the chances that an organization would be prosecuted for failure to comply as compared to a jurisdiction that has a passive regulatory structure.

Data volume factors 6230 assess the volume of an organization's data within each jurisdiction. Example data volume factors 6230 may include the number of data centers located in a jurisdiction, whether there are any large-volume data operations in the jurisdiction, and whether the organization considers the jurisdiction to be a "critical outsourcing location." Business criticality factors 6240 assess the criticality of the jurisdiction to the organization's overall business. Example business criticality factors 6240 may include the number of lines of business the organization has in the jurisdiction, the organization's revenue attributable to activities in the jurisdiction, and whether the organization is considering new market entry or expansion into the jurisdiction.

Jurisdictional matrix 6000 also includes weights 6300. Weights 6300 define a relative value for each matrix factor 6200. As one example, acquiring customer consent may be more complex than providing customer notification; accordingly, the weight assigned to the customer consent regulatory information 6210 is higher than the weight assigned to the customer notification regulatory information 6210. Applying weights 6300 to regulatory information 6210, regulatory oversight factors 6220, data volume factors 6230, and business criticality factors 6240 yield corresponding regulatory information scores 6410, regulatory oversight scores 6420, data volume scores 6430, and business criticality scores 6440, as shown in FIG. 6. Additionally, in this example, regulatory information scores 6410 may be added to yield an overall regulatory information score 6510; regulatory oversight scores 6420 may be added to yield overall regulatory oversight score 6520; data volume scores 6430 may be added to yield overall data volume score 6530; and business criticality scores 6440 may be added to yield overall business criticality score 6540.

In addition, for each jurisdiction, the regulatory information scores 6410, regulatory oversight scores 6420, data volume scores 6430, and business criticality scores 6440 may be added to yield a jurisdiction risk score 6600. Teachings of certain embodiments recognize that a jurisdiction risk score 6600 may approximately express the inherent risk associated with moving data out of a jurisdiction. In this example, a higher jurisdiction risk score 6600 indicates that a jurisdiction has a highly complex regulatory structure and/or the organization's exposure in the jurisdiction is high. Teachings of certain embodiments recognize that a quantitative expression of inherent risk may allow an organization to appropriately allocate resources towards minimizing the organization's risk in that jurisdiction.

In one embodiment, the jurisdiction risk scores 6600 identified in jurisdictional matrix 6000 may be compared to a break value, set at 255 in the exemplary jurisdictional matrix 6000. The break value represents a threshold that may be used to classify the jurisdictional risk scores 6600 as either high or low. Although the break value in this example is set at 255, teachings of certain embodiments recognize that the break value may be set to any suitable value. As one example, the break value may be set at the median or mean of all jurisdiction risk scores 6600. In some example embodiments, multiple threshold values may be used to categorize jurisdictional risk scores 6600 into different tiers.

Returning to risk workflow 2000 of FIG. 2, step 2300 may include steps 2310 and 2320. At step 2310, weights 6300 may be applied to regulatory information 6210 to yield regulatory information scores 6310 and overall regulatory information score 6410. In one example, the regulatory information 6210 include "yes" or "no" answers, with a "yes" answer having a value of 1 and a "no" answer having a value of 0. In this example, applying weights 6300 to the regulatory information 6210 converts the yes/no answers into numerical values that express both the existence of a factor in a jurisdiction and the importance of that factor as compared to the other factors.

At step 2320, weights 6300 may be applied to regulatory oversight factors 6220 to yield regulatory oversight scores 6320 and overall regulatory oversight score 6420. In one example, the regulatory oversight factors 6220 include "yes" or "no" answers, with a "yes" answer having a value of 1 and a "no" answer having a value of 0. In this example, applying weights 6300 to the regulatory oversight factors 6220 converts the yes/no answers into numerical values that express both the existence of a factor in a jurisdiction and the importance of that factor as compared to the other factors.

At step 2400, the organization's exposure in Jurisdiction A and Jurisdiction B may be determined. In this example, step 2400 may include steps 2410 and 2420. At step 2410, weights 6300 may be applied to data volume factors 6230 to yield data volume scores 6330 and overall data volume score 6430. In one example, the to data volume factors 6230 include "yes" or "no" answers, with a "yes" answer having a value of 1 and a "no" answer having a value of 0. In this example, applying weights 6300 to the to data volume factors 6230 converts the yes/no answers into numerical values that express both the existence of a factor in a jurisdiction and the importance of that factor as compared to the other factors.

At step 2420, weights 6300 may be applied to business criticality factors 6240 to yield business criticality scores 6340 and overall business criticality score 6440. In one example, the business criticality factors 6240 include "yes" or "no" answers, with a "yes" answer having a value of 1 and a "no" answer having a value of 0. In this example, applying weights 6300 to the business criticality factors 6240 converts the yes/no answers into numerical values that express both the existence of a factor in a jurisdiction and the importance of that factor as compared to the other factors.

At step 2500, jurisdiction risk scores 6600 for Jurisdiction A and Jurisdiction B may be determined. As explained above, a jurisdiction risk score 6600 may approximately express the inherent risk associated with moving data out of a jurisdiction. In this example, jurisdiction risk score 6600 may be determined by adding regulatory information scores 6410, regulatory oversight scores 6420, data volume scores 6430, and business criticality scores 6440, as shown in FIG. 6.

At step 2600, a project risk score 6700 may be determined. Teachings of certain embodiments recognize that a project risk score 6700 may approximately express the inherent risk associated with moving data out of each of the jurisdictions identified in the project. In this example, a higher project risk score 6700 indicates that the project includes a large number of jurisdictions with a highly complex regulatory structure and/or a large number of jurisdictions where the organization's exposure is high. Teachings of certain embodiments recognize that a quantitative expression of inherent risk may allow an organization to appropriately allocate resources towards minimizing the organization's risk associated with that project.

An example project risk score 6700 is shown by reference to example project summary 120, as shown in FIG. 8. Project summary 120 identifies different jurisdictional and organizational risk factors 6710 and counts the number of jurisdictions that have a high, medium, or low value for each risk factor. In the embodiment shown in FIG. 8, the example jurisdictional and organizational risk factors 6710 include overall regulatory information score 6410, overall data volume score 6430, overall business criticality score 6440, and weighed revenue factor score (selected from among the business criticality scores 6440). In this example, the project risk score 6700 is calculated as a function of the number of jurisdictions that have a high, medium, or low value for each of the identified jurisdictional and organizational risk factors 6710. In one example embodiment, the project risk score 6700 is calculated by applying weights to the totals of high, medium, and low values and then added to yield a composite score. The example project summary 120 of FIG. 8 will be described in greater detail below.

FIG. 3 shows action item workflow 3000 according to one embodiment. Action item workflow 3000 may determine restrictions on moving data from one or more jurisdictions. In some embodiments, workflow 3000 may identify action items in an effort to reduce risk associated with moving data out of a jurisdiction. For example, if a jurisdiction has a high inherent risk or a project has a high inherent risk, identifying and completing action items may mitigate inherent risk. In addition, workflow 3000 may provide a structured mechanism for applying regulations of a jurisdiction to a project and may reduce the need to refer to the regulations directly through the application of rules 410.

Action item workflow 3000 starts at step 3100. At step 3200, T-P-J information 220 is received. In this example, T-P-J information 220 identifies a request to move personally identifiable information (PII) out of Jurisdiction A. At step 3300, a set of data rules 410 are identified based on the T-P-J information 220. In this example, data rules 410 corresponding to Jurisdiction A regulations concerning data privacy are identified because the T-P-J information 220 identified Jurisdiction A and an intent to move PII data. The identified data rules 410 may include if/then/else scenarios developed from regulations of Jurisdiction A related to data privacy that identify whether and/or how the Jurisdiction A restricts movement of PII data out of a jurisdiction. In different embodiments, the identified data rules 410 may include all regulations of Jurisdiction A related to data privacy or a subset. As one example, the identified data rules 410 may include initial rules that, when applied, will lead to other rules and action items. At step 3400, the identified data rules 410 are applied against the request. FIG. 7A shows an example decision grid 415a for applying rules 410 to the request at step 3400 according to one embodiment. FIG. 7A will be described in the following paragraph.

FIG. 7A shows an example decision grid 415a. Decision grid 415a illustrates one example method for applying rules 410. Applying rule 1.0 to the T-P-J information 220 reveals that data privacy "regulatory restrictions [are] present" and that "specific restrictions" should be determined at rule 2.0. Applying rule 2.0 to the T-P-J information 220 reveals that "sensitive data elements" are involved, as that term is defined under the regulations of Jurisdiction A, and that the "sensitive data elements" should be determined at rule 2.1. Applying the rule 2.1 to the T-P-J information 220 reveals that "sensitive data elements are present in the project request" and that "regulatory compliance requirements" should be determined at rule 2.2. Applying the rule 2.2 reveals that "compliance requirements exist" and should be defined at rule 2.2a. Applying the rule 2.2a reveals that "customer notice [is] required" and that the organization should complete an action item: "deliver customer notice."

Returning to action item workflow 3000 of FIG. 3, step 3400 answered whether the request is allowed under the regulations of Jurisdiction A and what action items may facilitate compliance. In the example of FIG. 7A, decision grid 415a revealed that the requested data movement is allowed if customer notice is delivered.

At step 3500, the answer produced at step 3400 is analyzed to determine whether the rules 410 allow the requested data movement under any circumstances. In this example, the requested data movement is allowed if customer notice is delivered, so the action item workflow 3000 proceeds to step 3600. However, if the requested data movement had been prohibited in all circumstances, a response denying the request may be generated at step 3510. The response may be provided in any suitable form. In one example, a project summary 120 may indicate that the requested data movement is denied under any circumstances. In another example, external systems 600 may generate an email alerting the organization that the requested data movement is denied under any circumstances.

At step 3600, the answer produced at step 3400 is analyzed to determine whether the rules 410 require action items to be completed for compliance. In this example, the rules 410 require the organization to deliver customer notice to those customers required by the jurisdiction, so the action item workflow 3000 proceeds to step 3700. However, if the requested data movement had been allowed in all circumstances, a response allowing the request may be generated at step 3610.

At step 3700, the request and the action item are stored. In one example, the action item is stored as part of results 218. In another example, a project snapshot 710 is generated and records the request and the action item. In some embodiments, the results 218 and/or project snapshot 710 may be updated to record that the action item is completed. In this example, when the organization delivers the required customer notification, results 218 may be updated, project snapshot 710 may be updated, and copies of the customer notices may be stored at the document management repository as completion documents 720. A response reporting that the requested data movement is allowed subject to an action item may also be generated.

Teachings of certain embodiments recognize the capability to include verification steps to ensure that the identified action items accurately reflect the requirements of the governing regulations. As one example, a review board may determine whether a project will comply with each jurisdiction's regulations once the action items are completed. As an organization validates action items for projects over time, the organization may develop confidence that the action items and associated rules accurately reflect the governing regulations. Accordingly, teachings of certain embodiments recognize the capability to validate action items without submitting the action items for human review. For example, when an action item is generated, the request repository 200 may be searched for project records 210 that include similar action items. In one example, two action items may be considered similar if they require the organization to perform the same steps but to different data sets. If the search of request repository 200 reveals a similar action item that has been verified, in some embodiments the new generated action item may be deemed verified without human review. In an alternative embodiment, a new generated action item may be deemed verified without human review if searching the request repository 200 revealed a sufficient number of similar action items that have been verified (e.g., ten or more).

FIG. 4 shows update workflow 4000 according to one embodiment. Update workflow 4000 may update jurisdictional information for a project that involves moving data from a first jurisdiction. For example, action items may change over time due to changes in project information and/or changes in jurisdictional regulations. Teachings of certain embodiments recognize that update workflow 4000 may provide a structured mechanism for updating, adding, and removing action items through the application of rules 410 against existing projects and action items. Thus, workflow 4000 may update those actions that the organization should complete to maintain compliance with governing regulations.

Update workflow 4000 starts at step 4100. At step 4200, T-P-J information 220 and an associated action item are stored. In this example, T-P-J information 220 identifies a request to move personally identifiable information (PII) out of Jurisdiction A, and the associated action item requires the organization to provide customer notice, as identified by the decision grid 415a of FIG. 7A.

At step 4300, an update to the T-P-J information 220 or the rules 410 corresponding to Jurisdiction A is received. In this example, the update is to rules 410: as part of the update, Jurisdiction A now requires "customer consent" instead of "customer notice." Accordingly, in this example, step 4450 requires that update workflow 4000 proceed to step 4550. At step 4550, projects that involve moving data out of Jurisdiction A are identified. In this example, request repository 200 and/or document management repository 700 are searched to identify the T-P-J information 220 and action item stored at step 4200. At step 4650, the update to rules 410 are applied against the request. FIG. 7B shows an example method for applying updated rules 410 to the request at step 4650 according to one embodiment. FIG. 7B will be described in the following paragraph.

FIG. 7B shows an example decision grid 415b. Decision grid 415b proceeds to rule 2.2a similar to the decision grid 415a of FIG. 7A. However, rule 2.2a of decision grid 415b is different from rule 2.2a of decision grid 415a. Applying rule 2.2a reveals that "customer consent" is required and that the organization should "validate [that] customer consent is on file." If the "customer consent" is not on file, decision grid 415b proceeds to rule 2.2b, which identifies a new action item: "obtain customer consent." If "customer consent" is on file, decision grid 415b proceeds to rule 2.3. Applying rule 2.3 once "customer consent" is obtained reveals another action item: "obtain regulatory notification." Once "regulatory notification" is obtained, decision grid 415b proceeds to rule 2.4, which identifies another action item: "file regulatory notification with XYZ regulator." Once the "regulatory notification" is filed, decision grid 415b ends.

Returning to update workflow 4000 of FIG. 4, step 4650 answered whether the request is allowed under the updated regulations of Jurisdiction A and what action items may be required for compliance. At step 4750, the request and the updated action items are stored. In one example, the updated action items are stored as part of results 218. In another example, a project snapshot 710 is generated and records the request and the action items; this second snapshot 710 may be in addition to any project snapshot 710 generated at step 3700 of the action item workflow of FIG. 3.

Returning to step 4300 of update workflow 4000, if the received update is an update to T-P-J information 220, then step 4400 would indicate that the update workflow 4000 proceed to step 4500. At step 4500, a set of data rules 410 are identified in a manner similar to that described above with regard to step 3300 of action item workflow 3000. At step 4600, the identified data rules 410 are applied against the updated request in a manner similar to that described above with regard to step 3400 of action item workflow 3000. At step 4700, the request and the action item are stored in a manner similar to that described above with regard to step 3700 of action item workflow 3000 and/or step 4750 of update workflow 4000.

FIGS. 5A-5D show example request forms 110a and 110b according to one embodiment. In the illustrated example, request forms 110a and 110b include intake form 110a and assessment form 110b. Together, request forms 110a and 110b include several fields for receiving project information, including project information 212, data movement information 214, and jurisdiction information 216. As one example, data movement information 214 may be derived in part from the identified "purpose of using the above mentioned data" in Question 6 of intake form 110a. In this example, the purpose information may be included in T-P-J information 220.

FIG. 8 shows an example project summary 120 according to one embodiment. As explained above, project summary 120 may display project risk score 6700 and organizational risk factors 6710. Project summary 120 may also show action item summary information. For example, FIG. 8 shows action item summary information derived from decision grid 415b. In this example, Jurisdiction A included a data privacy regulation requirement that "regulatory notification be filed with XYZ regulation." According to this example project summary 120, the task of filing the regulatory notification has been assigned within the organization to "Mr. Person," and Mr. Person has one month to complete the task. The example project summary 120 also includes high, medium, and low values derived from the overall regulatory information score 6510, the overall regulatory oversight score 6520, the overall data volume score 6530, and the overall business criticality score 6540 of FIG. 6. As explained above, these high, medium, and low values may be derived by comparing each score to one or more threshold values.

In some embodiments, updates to a project may yield new and/or updated project summaries 120. Update events may include, but are not limited to, times when action items are identified, when action items are completed, when action items are changed, when regulations or rules have changed, and when any other project information has changed. As one example, if updated action items are identified through update workflow 4000, the updated action items may be shown on updated project summaries 120. As another example, if Jurisdiction A changes their regulatory requirements, the changes may result in different values for: the project risk score 6700; the organizational risk factors 6710; the identified action items; and/or the high, medium, and low values derived from the overall regulatory information score 6510, the overall regulatory oversight score 6520, the overall data volume score 6530, and the overall business criticality score 6540 of FIG. 6.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A data movement system comprising:
a memory operable to store a request to move data from a first jurisdiction and at least one action item associated with the request to move data, the request to move data comprising a group of attributes including (a) a data type describing a category of the data to be moved, (b) a jurisdiction from which the data is to be moved, and (c) a purpose for moving the data; and
a processor configured to:
receive an update to the request to move data, the update to the request changing at least one attribute of the group of attributes of the request to move data;
identify a set of data movement rules based at least in part upon the updated request to move data, wherein the set of data movement rules are associated with regulations that restrict the movement of data out of the first jurisdiction identified in the updated request; and apply at least one rule of the set of data movement rules to identify an update to the at least one action item to be completed in order to bring movement of the data into compliance at least in part with the regulations that restrict the movement of data out of the first jurisdiction;

wherein:
the at least one action item specifies an action to be performed to comply with the regulations of the first jurisdiction or to mitigate risks associated with moving data out of the first jurisdiction;
the regulations that restrict the movement of data out of the first jurisdiction comprise:
one or more regulations regarding personally identifiable information;
one or more regulations for ensuring that information is accessible only to those authorized to have access; and
one or more regulations regarding hiring an external organization to perform functions using an organization's data;
the memory is configured to store the request and the at least one action item by storing the request and the at least one action item as a project record in a project repository;
the processor is further configured to, in response to receiving the update to the request to move data, search the project repository for the project record;
the project record comprises a first project record, and the processor is further configured to generate a second project record that stores the update to the request and the update to the at least one action item;
the first project record further comprises the identified set of data movement rules, an identification of the regulations associated with the identified set of data movement rules, and copies of documents created during execution of the at least one action item; and
the second project record further comprises the identified set of data movement rules, an identification of the regulations associated with the identified set of data movement rules, and copies of documents created during execution of the update to the at least one action item.

2. The system of claim 1, wherein the update to the request identifies the stored request according to a project identifier.

3. The system of claim 1, wherein the processor is configured to search the project repository by searching the project repository for more than one project record affected by the update.

4. The data movement system of claim 1, wherein the at least one attribute that is changed by the update to the request to move data includes the data type describing the category of the data to be moved.

5. The data movement system of claim 1, wherein the at least one attribute that is changed by the update to the request to move data includes the jurisdiction from which the data is to be moved.

6. The data movement system of claim 1, wherein the at least one attribute that is changed by the update to the request to move data includes the purpose for moving the data.

7. The system of claim 1, wherein the regulations that restrict the movement of data out of the jurisdiction involve data privacy, data secrecy, and data outsourcing.

8. A method for updating jurisdictional restrictions on a project that involves moving data from a first jurisdiction, the method comprising:

storing a request to move data and at least one action item associated with the request to move data, the request to move data comprising (a) a data type describing a category of the data to be moved, (b) a jurisdiction from which the data is to be moved, and (c) a purpose for moving the data;

receiving an update to the request to move data, the update to the request changing at least one of the data type describing the category of the data to be moved, the jurisdiction from which the data is to be moved, or the purpose for moving the data;

identifying, by a processor, a set of data movement rules based at least in part upon the updated request to move data, wherein the set of data movement rules are associated with regulations that restrict the movement of data out of the jurisdiction identified in the updated request; and applying, by the processor, at least one rule of the set of data movement rules to identify an update to the at least one action item to be completed in order to bring movement of the data into compliance at least in part with the regulations that restrict the movement of data out the jurisdiction;

wherein:
the action item specifies an action to be performed to comply with the regulations of the jurisdiction or to mitigate risks associated with moving data out of the jurisdiction;
the regulations that restrict the movement of data out of the jurisdiction comprise:
one or more regulations regarding personally identifiable information;
one or more regulations for ensuring that information is accessible only to those authorized to have access; and
one or more regulations regarding hiring an external organization to perform functions using an organization's data;
storing the request and the at least one action item comprises storing the request and the at least one action item as a project record in a project repository, the method further comprising, in response to receiving the update to the request to move data, searching the project repository for the project record;
the project record comprises a first project record, and the method further comprises generating a second project record that stores the update to the request and the update to the at least one action item;
the first project record further comprises the identified set of data movement rules, an identification of the regulations associated with the identified set of data movement rules, and copies of documents created during execution of the at least one action item; and
the second project record further comprises the identified set of data movement rules, an identification of the regulations associated with the identified set of data movement rules, and copies of documents created during execution of the update to the at least one action item.

9. A data movement system comprising:
a memory operable to store a set of data movement rules, wherein the set of data movement rules are associated with regulations that restrict the movement of data out of at least one jurisdiction; and a processor configured to:
  receive an update to at least one rule of the set of data movement rules, the update representing a change to at least one regulation of the at least one jurisdiction;
  identify a project that involves moving data out of the at least one jurisdiction, the project comprising a request to move data out of the at least one jurisdiction and at least one action item to be performed to cause movement of the data according to the request to move data to comply at least in part with the regulations that restrict the movement of data out of the at least one jurisdiction; and
  apply the updated data movement rule to determine an update to the at least one action item;
wherein:
  the at least one action item specifies an action to be performed to comply with the regulations of the at least one jurisdiction or to mitigate risks associated with moving data out of the at least one jurisdiction;
  the regulations that restrict the movement of data out of the at least one jurisdiction comprise:
    one or more regulations regarding personally identifiable information;
    one or more regulations for ensuring that information is accessible only to those authorized to have access; and
    one or more regulations regarding hiring an external organization to perform functions using an organization's data;
  the memory is configured to store the request and the at least one action item by storing the request and the at least one action item as a project record in a project repository;
  the processor is further configured to, in response to receiving an update to the request to move data, search the project repository for the project record;
  the project record comprises a first project record, and the processor is further configured to generate a second project record that stores the update to the request and the update to the at least one action item;
  the first project record further comprises the identified set of data movement rules, an identification of the regulations associated with the set of data movement rules, and copies of documents created during execution of the at least one action item; and
  the second project record further comprises the identified set of data movement rules, an identification of the regulations associated with the set of data movement rules, and copies of documents created during execution of the update to the at least one action item.

10. The system of claim 9, wherein the processor is configured to search the project repository by searching the project repository for more than one project record affected by the update.

11. The system of claim 9, wherein the project comprises a project name and a project identifier.

12. A method for updating jurisdictional restrictions on moving data across jurisdictional borders, the method comprising:

storing a set of data movement rules, wherein the set of data movement rules are associated with regulations that restrict the movement of data out of at least one jurisdiction;
receiving an update to at least one rule of the set of data movement rules, the update representing a change to at least one regulation of the at least one jurisdiction;
identifying, by a processor, a project that involves moving data out of the at least one jurisdiction, the project comprising a request to move data out of the at least one jurisdiction and at least one action item to be performed to cause movement of the data according to the request to move data to comply at least in part with the regulations that restrict the movement of data out of the at least one jurisdiction;
storing the request to move data and the at least one action item; and
applying, by the processor, the updated data movement rule to determine an update to the at least one action item;
wherein:
  the at least one action item specifies an action to be performed to comply with the regulations of the at least one jurisdiction or to mitigate risks associated with moving data out of the at least one jurisdiction;
  the regulations that restrict the movement of data out of the at least one jurisdiction comprise:
    one or more regulations regarding personally identifiable information;
    one or more regulations for ensuring that information is accessible only to those authorized to have access; and
    one or more regulations regarding hiring an external organization to perform functions using an organization's data;
  storing the request and the at least one action item comprises storing the request and the at least one action item as a project record in a project repository, the method further comprising, in response to the receiving an update to the request to move data, searching the project repository for the project record;
  the project record comprises a first project record, and the method further comprises generating a second project record that stores the update to the request and the update to the at least one action item;
  the first project record further comprises the identified set of data movement rules, an identification of the regulations associated with the set of data movement rules, and copies of documents created during execution of the at least one action item; and
  the second project record further comprises the identified set of data movement rules, an identification of the regulations associated with the set of data movement rules, and copies of documents created during execution of the update to the at least one action item.

* * * * *